US012786496B2

(12) United States Patent
Sain et al.

(10) Patent No.: US 12,786,496 B2
(45) Date of Patent: Nov. 3, 2026

(54) ENGAGEMENT MEASUREMENT IN IN-FLIGHT ENTERTAINMENT SYSTEMS

(71) Applicant: Panasonic Avionics Corporation, Irvine, CA (US)

(72) Inventors: Kenneth William Sain, Irvine, CA (US); Andrew Timothy Masson, Trabuco Canyon, CA (US); Mehdi Izadyar, Trabuco Canyon, CA (US); Anand Desikan, San Ramon, CA (US)

(73) Assignee: Panasonic Avionics Corporation, Irvine, CA (US)

( * ) Notice: Subject to any disclaimer, the term of this patent is extended or adjusted under 35 U.S.C. 154(b) by 0 days.

(21) Appl. No.: 19/205,513

(22) Filed: May 12, 2025

(65) Prior Publication Data

US 2025/0280164 A1 Sep. 4, 2025

Related U.S. Application Data

(63) Continuation of application No. 18/444,226, filed on Feb. 16, 2024, now Pat. No. 12,309,443, which is a
(Continued)

(51) Int. Cl.
*H04N 21/258* (2011.01)
*B64D 11/00* (2006.01)
(Continued)

(52) U.S. Cl.
CPC . *H04N 21/25891* (2013.01); *H04N 21/41422* (2013.01); *H04N 21/44204* (2013.01); *H04N 21/44222* (2013.01); *B64D 11/00151* (2014.12)

(58) Field of Classification Search
CPC ....... H04N 21/25891; H04N 21/41422; H04N 21/44204; H04N 21/44222;
(Continued)

(56) References Cited

U.S. PATENT DOCUMENTS 9,616,993 B1 * 4/2017 Shapiro .................. B64C 13/18
9,852,355 B2 * 12/2017 Couleaud ......... H04N 21/25883
(Continued)

FOREIGN PATENT DOCUMENTS

WO 2020251533 A1 12/2020

OTHER PUBLICATIONS

Extended Search Report from European Patent Application No. 23161536.0 dated Jul. 20, 2023.
(Continued)

*Primary Examiner* — Nathan J Flynn
*Assistant Examiner* — Christine A Kurien
(74) *Attorney, Agent, or Firm* — Ashurst Perkins Coie US LLP

(57) ABSTRACT

A system for data collection in a commercial travel setting is described. The system includes a plurality of sensor circuits that collect a plurality of sensor data values from in-flight entertainment (IFE) network. The system includes a sensor data processor that interprets the plurality of sensor data values. The system includes a passenger profile management controller configured that filters the plurality of sensor data values by processing a plurality of passenger profiles that are related to at least some of the plurality of sensor data values. The system generates a measurement index that is normalized with respect to the plurality of sensor data values or the plurality of passenger profiles.

20 Claims, 10 Drawing Sheets

Related U.S. Application Data continuation of application No. 17/655,538, filed on Mar. 18, 2022, now Pat. No. 11,910,043.

(51) Int. Cl.
*H04N 21/414* (2011.01)
*H04N 21/442* (2011.01)

(58) Field of Classification Search
CPC ............. H04N 21/2146; H04N 21/258; H04N 21/422; B64D 11/00151; G06Q 50/40
See application file for complete search history.

(56) References Cited

U.S. PATENT DOCUMENTS

| | | | | |
|---|---|---|---|---|
| 2005/0209907 | A1 | 9/2005 | Williams | |
| 2008/0163670 | A1 * | 7/2008 | Georgeson | G08B 31/00 73/23.31 |
| 2009/0138920 | A1 * | 5/2009 | Anandpura | H04N 21/2146 725/76 |
| 2015/0058681 | A1 | 2/2015 | Lingannapeta et al. | |
| 2016/0286258 | A1 * | 9/2016 | Rajagopal | H04N 21/262 |
| 2016/0378199 | A1 * | 12/2016 | Sizelove | G06F 3/0202 235/449 |
| 2017/0286037 | A1 * | 10/2017 | Sizelove | H04W 12/088 |
| 2018/0004386 | A1 * | 1/2018 | Hinckley | G06F 3/0416 |
| 2018/0079322 | A1 * | 3/2018 | Tanriover | B60N 2/0277 |
| 2019/0028556 | A1 * | 1/2019 | Ben-Harrush | H04L 67/306 |
| 2019/0056862 | A1 * | 2/2019 | Gilbert | G06F 3/01 |
| 2019/0179482 | A1 * | 6/2019 | Ghosh | G06F 3/0416 |
| 2019/0312941 | A1 | 10/2019 | Maccini et al. | |
| 2020/0192532 | A1 * | 6/2020 | Van Wiemeersch | B60K 35/10 |
| 2020/0239002 | A1 * | 7/2020 | Sobhany | A61B 5/165 |
| 2020/0242421 | A1 * | 7/2020 | Sobhany | A61B 5/165 |
| 2020/0265735 | A1 * | 8/2020 | Byron | G09B 5/08 |
| 2020/0342040 | A1 * | 10/2020 | Adams | G06Q 20/12 |
| 2021/0014452 | A1 * | 1/2021 | Rocklin | H04L 65/403 |
| 2021/0150587 | A1 * | 5/2021 | Rizvi | G06Q 30/0267 |
| 2021/0240723 | A1 * | 8/2021 | Sheriff | G06F 16/182 |
| 2023/0300394 | A1 * | 9/2023 | Sain | G06Q 50/40 715/719 |

OTHER PUBLICATIONS

Search Report Under Section 17(5) from GB Patent Application No. 2303641.1 dated Sep. 28, 2023.

* cited by examiner

ENGAGEMENT MEASUREMENT IN IN-FLIGHT ENTERTAINMENT SYSTEMS

CROSS REFERENCE TO RELATED APPLICATIONS

This application is a continuation of U.S. patent application Ser. No. 18/444,226, filed Feb. 16, 2024, which is a continuation of U.S. patent application Ser. No. 17/655,538, filed on Mar. 18, 2022 (now U.S. Pat. No. 11,910,043 issued Feb. 20, 2024). The content of the foregoing applications is incorporated herein in its entirety by reference.

TECHNICAL FIELD

This application is related to collection and analysis of passenger interactions with an in-flight entertainment system.

BACKGROUND

Commercial travel has evolved to provide entertainment options to passengers traveling to their destinations. For example, in an airplane or train, entertainment options are provided on monitors located on the back of seats, where the monitors can enable passengers to watch movies or television shows as they travel to their destinations. Passenger vehicles have also begun to provide connectivity tools that may provide additional opportunities to passengers for entertainment or productivity.

SUMMARY

The present document provides various techniques for tracking and reporting passenger engagement with various entertainment and productivity electronics, sensors and services provided on a passenger airplane.

In one example aspect, A system for data collection in a commercial travel setting is disclosed. The system includes a plurality of sensor circuits configured to collect a plurality of sensor data values from a plurality of sensors including sensors from an in-flight entertainment (IFE) network in an airplane in a set of airplanes; a sensor data processor configured to interpret the plurality of sensor data values from the plurality of sensors according to a rule; a sensor data storage controller configured to store the plurality of sensor data values according to a plurality of sensor data profiles, the plurality of sensor data profiles being associated with sensor types; a passenger profile management controller configured to filter the plurality of sensor data values by processing a plurality of passenger profiles that are related to at least some of the plurality of sensor data values; a processor configured to analyze the plurality of sensor data values using the rule and produce a measurement index according to each of the plurality of passenger profiles; and a data storage that is structured to store the indexes corresponding to the plurality of passenger profiles such that the indexes are available through a query from an authorized agent, wherein the indexes are normalized with respect to the plurality of sensor data values or the plurality of passenger profiles.

In another example aspect a system is disclosed to include a sensor network configured to electronically collect a plurality of sensor data values from a plurality of sensors in a commercial passenger vehicle, a passenger information database that is configured to store passenger information, a rule database that is configured to store a set of rules associated with the passenger information database and the sensor network, one or more processors configured to (a) receive an instruction to generate a measurement report, and (b) generate the measurement report according to the instruction by processing information from the passenger information database and the plurality sensor data values according to a rule from the set of rules identified by the instruction; and a user interface configured to present the measurement report.

In another example aspect, a method of passenger activity measurement is disclosed. The method includes operating a sensor network to electronically collect a plurality of sensor data values from a plurality of sensors associated with an inflight entertainment (IFE) network in a commercial passenger vehicle; storing passenger information pertaining to passengers in the commercial passenger vehicle in a passenger information database; storing a set of rules associated with the passenger information database and the plurality of sensor data values in a computer memory; and generating a measurement report of by processing the plurality of sensor data values and the passenger information database according to a rule from the set of rules; and providing the measurement report on a display interface according to a display selection.

In yet another aspect, a computer readable medium is disclosed. The computer readable medium stores processor-executable program code that, upon execution by one or more processors, causes implementation of a method described in the present document.

These, and other aspects are disclosed throughout the present document.

DETAILED DESCRIPTION

1. Introduction

Figure 1:
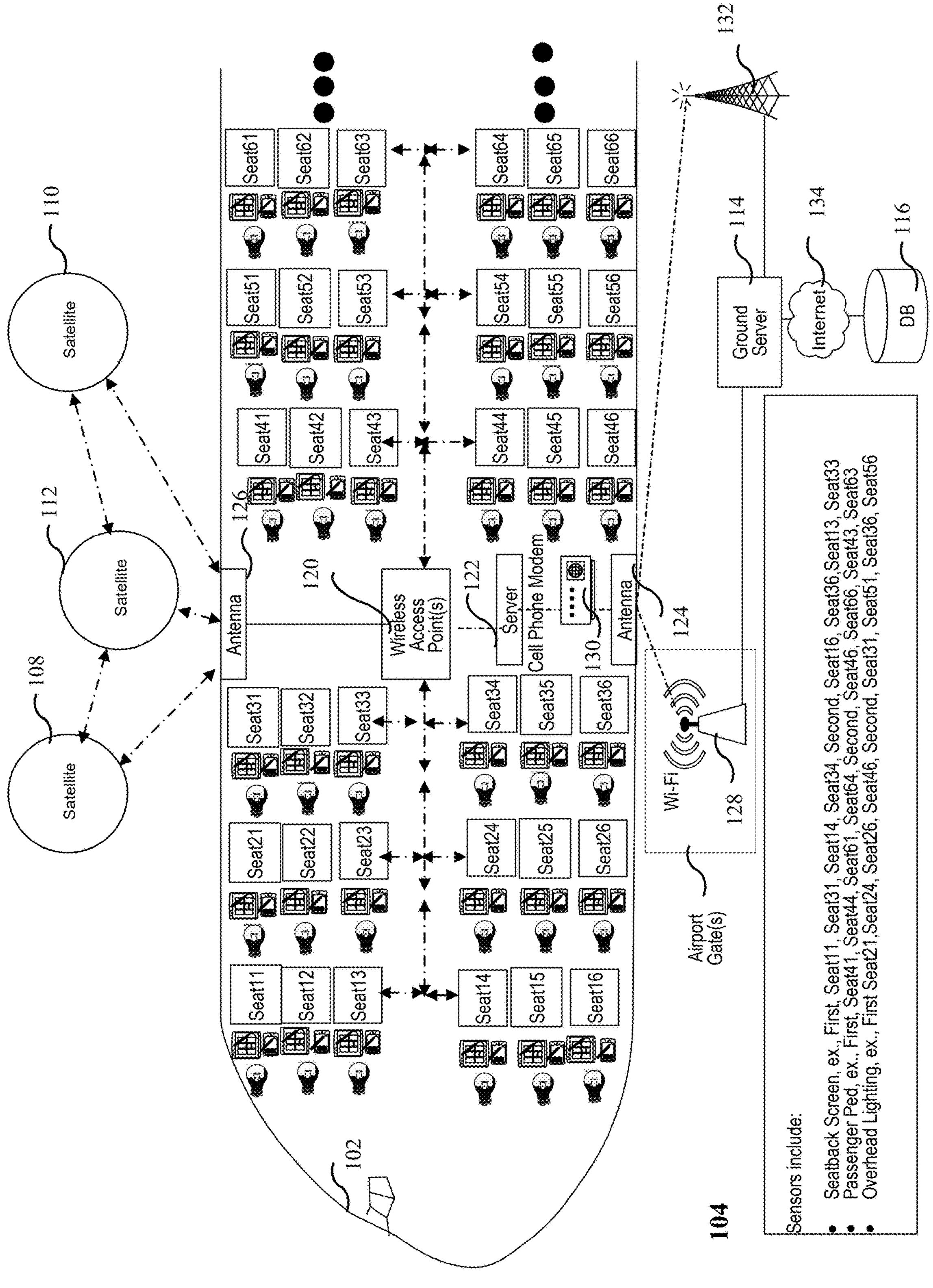
FIG. 1 shows an exemplary airplane depicting an IFE installation.

Among the many advancements in aircraft technology, improvements in passenger comfort and convenience have received much attention. Air travel typically involves journeys over extended distances that at the very least take several hours to complete, so airlines provide onboard in-flight entertainment and communications (IFEC) systems that offer a wide variety of multimedia content for passenger enjoyment. Recently released movies are a popular viewing choice, as are television shows such as news programs, situation and stand-up comedies, documentaries, and so on. Useful information about the destination such as airport disembarking procedures, immigration and custom procedures and the like are also frequently presented. Audio-only programming is also available, typically comprised of playlists of songs fitting into a common theme or genre. Likewise, video-only content such as flight progress mapping, flight status displays, and so forth are available. Many in-flight entertainment systems also include video games that may be played by the passenger.

The specific installation may vary depending on service class, though in general, each passenger seat is equipped with a display device, an audio output modality, an input modality, and a terminal unit. The terminal unit may generate video and audio signals, receive inputs from the input modality, and execute pre-programmed instructions in response thereto. The display device is typically an LCD screen that is installed on the seatback of the row in front of the passenger, though in some cases it may be mounted to a bulkhead or retractable arm, or the like, that is in turn mounted to the passenger's seat. Furthermore, the audio output modality is a headphone jack, to which a headphone, either supplied by the airline or by the passenger, may be connected. Inputs to the terminal unit may be provided via a separate multi-function remote controller or by via a combination touch display. Although the terminal unit and display device were separate components in earlier IFEC implementations, more recently, these components and more may be integrated into a single smart monitor.

The multimedia content is encoded and stored as digital data, with a video decoder and audio decoder of the terminal unit functioning to generate the aforementioned video and audio signals therefrom. It is desirable to have a wide range of different multimedia content to satisfy the varying tastes of passengers. It is also desirable to have a sufficient volume of multimedia content so that passengers can remain occupied with entertainment for the entire duration of the flight. Accordingly, the multimedia content stored onboard the aircraft can range in the hundreds of gigabytes, if not over a terabyte. The majority of the data comprises the video programming, although the audio and video game content may be significant as well. This data is typically not stored on each individual terminal unit, but rather, in a central content server also onboard the aircraft. In this regard, the terminal unit is understood to incorporate networking modalities such as Ethernet to establish data communications with the central content server. Once a particular selection of multimedia content is requested by the passenger via the content selection application, the terminal unit may retrieve the same from the central content server, decode the data, and present it to the passenger.

Because the personal tastes and preferences of passengers can vary considerably, airlines maintain a wide range of multimedia content onboard the content server. Furthermore, in addition to variety of volume, novelty is as important for airlines to keep its passengers engaged with the in-flight entertainment system, particularly for valuable frequent fliers. A variety of modalities, including portable content loaders, wireless modules, and the like may be used to load sets of multimedia content to the content server. The content update process typically takes place on a monthly schedule, preferably during a layover between flights, such as when aircraft maintenance is conducted. For each item of multimedia content loaded on to the IFEC system in this way, however, the airlines must pay a fee. Specifically, the charges are based upon the size of the multimedia content set loaded, as well as the number of cycles or intervals over which the multimedia content is maintained on an aircraft. Scaled to an entire fleet of aircraft, these charges may be substantial, and because they are levied against the entire content set that is loaded on the aircraft, airlines are being charged for content that is viewed less frequently and/or not being viewed at all.

Additionally, there is a growing trend to allow passengers to use their personal electronic devices (PEDs) (e.g., smartphone, laptops, or tablets) for entertainment, which allows passengers to minimize having to touch a commonly exposed surface. The audio or video content provided by the IFEC platform to the PED may include movies, television shows, or other content such as advertisements or flight safety video. Each seatback device has an enclosure that can have a processor executing custom software programs to receive messages or commands from an edge server and to display visual content on a display of the seatback device and to output sound to a headphone jack. Conventional in-vehicle entertainment systems can also wirelessly transmit audio or video content to PEDs that belong to passengers.

The above-described passenger amenities and services are provided using an electronic network that includes video servers, wiring, seatback displays, card readers, wireless network equipment, satellite transmission and reception equipment and so on. Deployment and maintenance of this equipment can be expensive, which requires the airlines to pay attention to which electronic systems and services are used by passengers more frequently or longer. Therefore, it is beneficial for airlines to measure and monitor use of various electronic equipment by passengers. For example, one benefit is to ensure passenger satisfaction, which may lead to the passenger preferring to travel on a particular airline. Another benefit is that airlines are able to find out the electronic systems that are popular and heavily used and may focus their maintenance and replacement resources to ensure that these electronic systems are available to passengers without minimum down time or errors. Situation: no standard way to quantify or qualify passenger engagement (in the cabin)

In the airlines industry, a variety of IFEC installment options are currently deployed. These solutions may include different IFE electronics vendors, different configuration of IFE deployments for different airplane models, different features of IFE systems offered by different airlines, or different types of IFE offered in different geographic areas. Such variations in the IFE deployments often make it difficult to measure effectiveness and use data of IFE electronics across different airlines, different IFE vendors, and different airplane models.

As further disclosed in the present document, using the techniques described herein, it may be possible for embodiments to quantify the passenger entertainment and interaction with IFE electronics using a metric that is comparable across various deployment configurations. For example, this measurement index may be called Passenger Engagement Minutes (PEM) and may represent a time that a passenger uses an IFEC platform. This quantity may be used by airlines to quantify and maximize customer engagement minutes and quality (e.g., by determining that activity A results in a greater passenger use than activity B).

Advantageously, a particular airline may be able to measure PEMs for the airline to get a trend of its performance; make decisions about upgrade cycle of various components of the IFEC platform and evaluate effectiveness of various IFEC platform solutions available in the market.

In some embodiments, the use data may be measured to output a report for an airline cabin experience and a decision process about the type of content made available to users (e.g., movie genres, video games, wireless connectivity, and so on.).

In some embodiments, the measurement of passenger interaction may also measure passenger interactions with sensors that allow passengers to perform electronic commerce transactions during travel such as online purchasing, buying movies to watch during travel, and so on. Such information may be used in deciding configuration of video libraries or shopping catalogs offered to the passengers.

In some embodiments, the measurements may be normalized across different variables—e.g., normalized across different equipment type used by an airline, or normalized across different airlines that use a same IFEC platform, a travel duration, a passenger travel class, and so on. For example, in some embodiments, every passenger interaction with the IFEC system may be logged and measured. The interaction may be, e.g., movie watching or movie guide browsing, television watching, online surfing, etc.). Such interactions may be measured in units of time, e.g., minutes, and a total number of passenger engagement minutes may be logged for each airplane trip. One measure of normalization that may be used may be based on determining a total number of engagement minutes available to passengers and using this total number of minutes to normalize actual passenger engagement minutes. As further disclosed in the present document, the total number of engagement minutes may be determined based on airplane flight segment, actual take-off and landing times, sensor information gathered from onboard video servers regarding active time during which content was available for viewing, sensor information captured from onboard wireless connectivity sensors regarding the duration for which wireless connectivity was made available to passengers, and so on.

In some embodiments, such data may be stored in a database that can be queried according to a filtering criterion and a visual presentation may be provided according to a requested filter criterion.

2. Exemplary Computing System and IFEC Deployments

FIG. 1 shows an example system in which the various methods embodiments described in the present document may be implemented. An airplane 102 is depicted to include multiple passenger seats, Seat 11 to Seat 66. The airplane 102 may include an antenna 126 that is configured to communicate with external communication sources such as a satellite network that includes one or more satellites 108, 110, 112. Satellite communication may be used for both downloading information and uploading information. Wi-Fi 128 at airport gate(s) and Cell-phone modem 130 through a Cell Phone Tower 132 may be used to both downloading information and uploading information from/to ground server 114 through the Internet 134 and from/to database 116 as illustrated most notably in FIG. 1.

The airplane 102 may include an onboard server 122, one or more wireless access points 120 and an antenna 124 that is configured for communication with a ground server 114 that includes a database 116.

Also shown in FIG. 1 is an example of a script 104 that is used for collecting sensor data on the airplane 102. The script 104 may include a list of entries that show zones where sensor data, e.g., raw intrinsic data, raw extrinsic data, raw global data, is collected and ordered. For example, the first entry shows that seats 11, 31, 14, 34 are to be first, followed by seats 34, 16, 36, 13 and 33, and so on. Corresponding to each entry, there may be an onboard electronic device on passengers may be alerted for collecting sensor data from a sensor network, for example, including Seatback Display (illustrated by screen icon), Passenger PED, and Overhead Lighting (illustrated by light bulb icon).

For example, for the above-listed seats, a message may be displayed on a seatback screen. For the next entry (corresponding to seats 41, 33, 61 and 64) a message may be sent to passengers' personal electronic devices (PEDs) for data sensor collection instructions, e.g., take a survey or complete a questionnaire, and/or as scripted for the sensor data collected by the sensor network about passengers about one or more aspects or incidents (e.g., when, during, what, before, during or at end one or more flights or destinations, number or quantity of or time of or time duration) in their trip, e.g., watching movies, browsing selected live television programs, sports casts, preferences for food, drink, and snack selections, cleanliness of the airplane, crew availability or helpfulness or resolving issues, informativeness of captain about flight and status to destination, and politeness and promptness of aircraft attendants. In one example, as illustrated in FIG. 1, seats 11, 31, 14, 34 (first) and seats 16, 36, 13, and 33 (second) are scripted as passengers for collecting sensor data from the sensor network, e.g., before flight, after flight at designated intervals or upon certain events (e.g., when, during, what, before, during or at end one or more flights or destinations, number or quantity of or time of or time duration), e.g., calling attendant, ordering food, ordering movies, surfing the Internet, using or clicking features of the Seatback Display or, and before, during, or upon deplaning; seats 41, 44, 61, 64 (first) and seats 46, 66, 43, 63 (second) are scripted as passengers for collecting sensor data from the sensor network before flight, after flight at designated intervals or upon certain events (e.g., when, during, what, before, during or at end one or more flights or destinations, number or quantity of or time of or time duration), and during deplaning; and seats 21, 24, 26, 46 (first) and seats 31, 51, 36, 56 (second) are scripted as passengers for collecting sensor data from the sensor network (e.g., when, during, what, before, during or at end one or more flights or destinations, number or quantity of or time of or time duration) before flight, after flight at designated intervals, and during deplaning.

Figure 3:
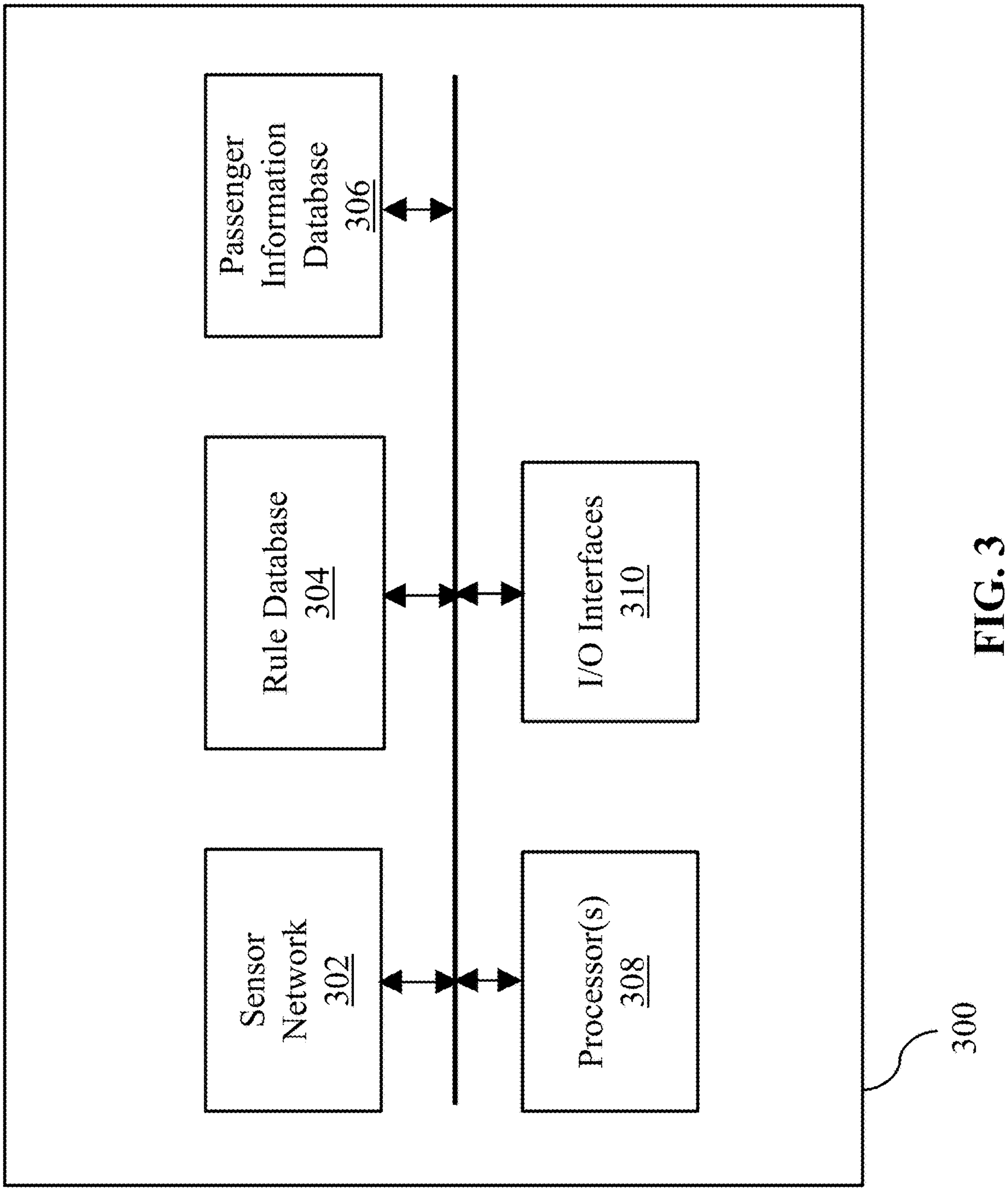
FIG. 3 shows an example of a rule-based system for sensor data analysis.

Continuing with FIG. 1, in some embodiments, passengers, individual passenger(s), and/or group(s) of passengers, and/or airline personnel can each select one or more mode(s) for collecting sensor data, e.g., Seatback Screen, overhead lighting, Passenger PED, for example, by entry into to a Seatback Screen, a passenger manifest, or an airline companion app downloaded on a mobile device (a Passenger PED) of a passenger. In some embodiments, passengers and/or individual passenger(s) and/or group(s) of passengers are selected for collecting sensor data in accordance with one or more screening criteria, e.g., when, how often, how, . . . or combinations thereof including: location of origin for flight, location of destination of flight, location of layover flight, news or history of events at origin, destination, or layover flight, monitor passenger health status during flight, traveling together family members, traveling together friends, business partners, and/or any other methods or systems described above or below, adjustments for collecting sensor data, when, how, how much, how often or ordering, for example, physical separation or time gap(s)

between passenger seats (as illustrated in FIGS. 1 and 1), any empty seats or rows, or the like. In FIG. 1, the server 122 may be implemented using the device 300 described below with reference to FIG. 3. The server 122 may implement the script described in the present document. The wireless access points 120 may be used for prompting PEDs via messages to deplane. In some embodiments, the wireless access points may be used for detecting PEDs based on signal quality (e.g., signal strength) and this information may be used to determine travel configuration of the airplane during flight. The antenna 124 may be used for communication between the ground server 114 and the server 122. The ground server 114 may provide the server 122 with passenger information, or passenger manifest, prior to the departure of the flight. The ground server 114 may also provide additional information about passenger such as passenger's previous flight history or other social activities such that prior passenger engagements with IFE tracing can be performed.

Figure 4A:
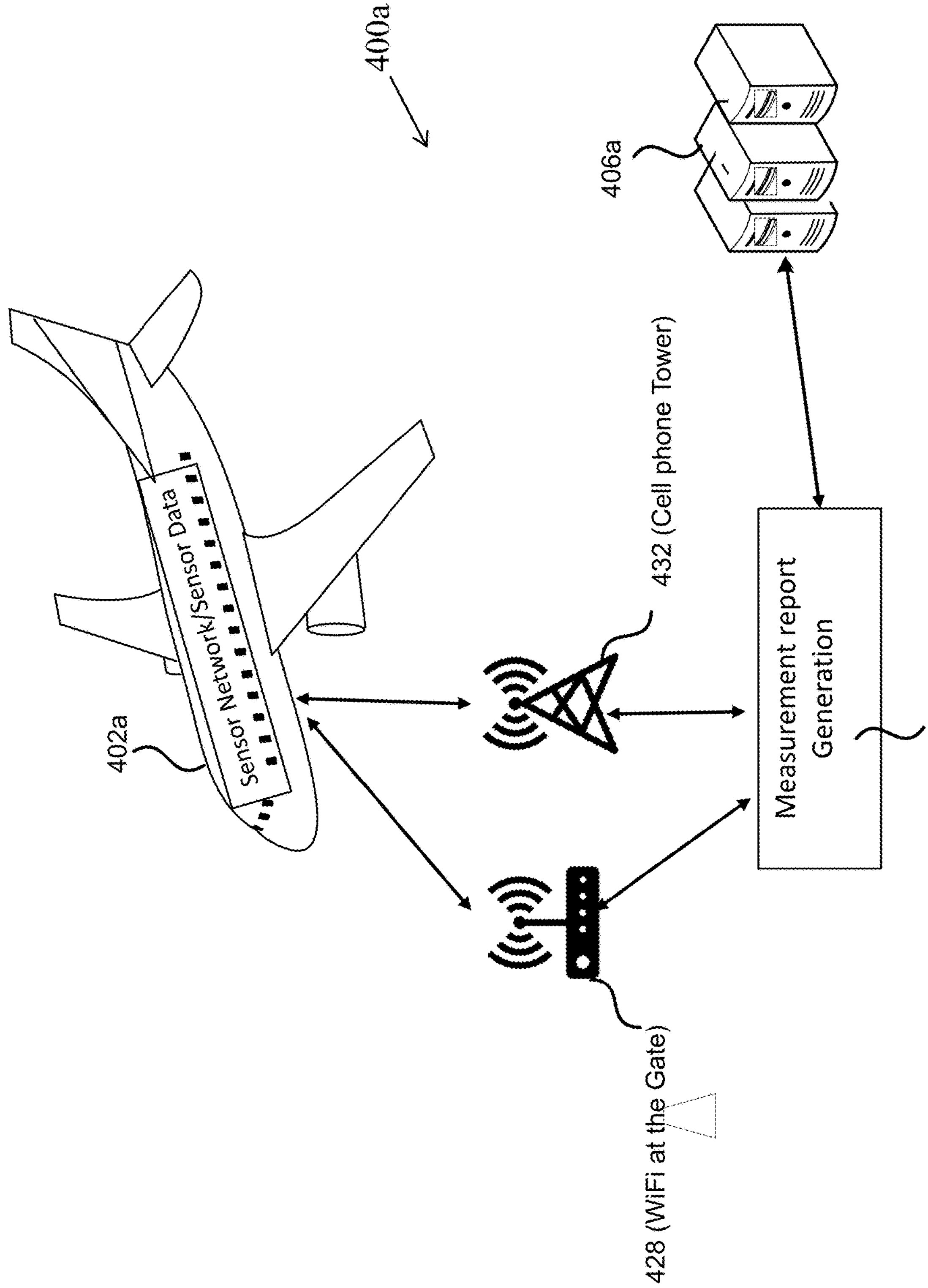
FIG. 4A shows an airline network for sensor data capture and analysis.
Figure 4B:
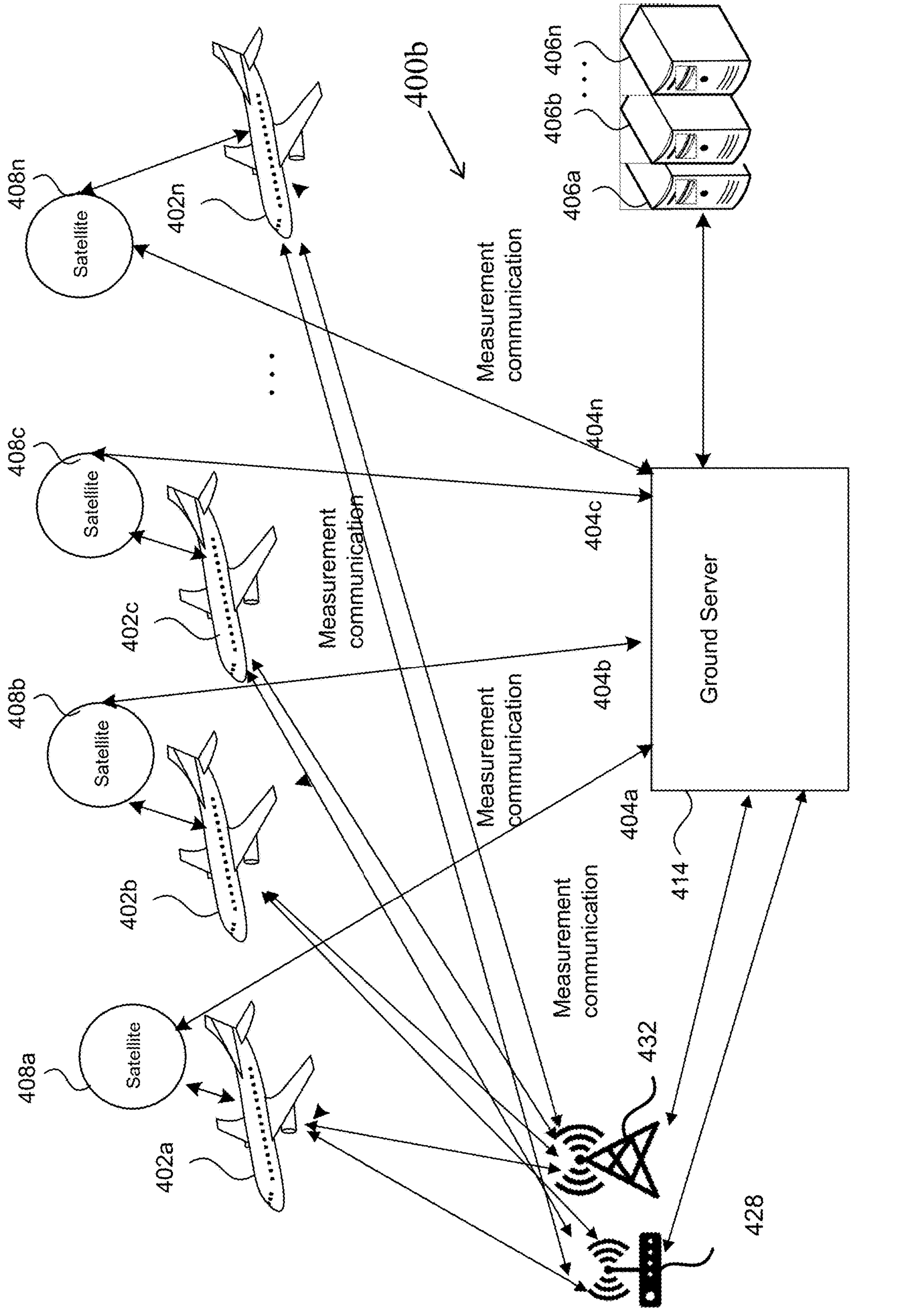
FIG. 4B shows a multiple-airline network for sensor data capture and analysis.

FIGS. 4A-4B show an exemplary system for sensor data gathering, processing and measurement report generation. In particular, FIGS. 4A and 4B shows a communication network in which sensor network **402*a* and sensor data may be collected and communicated to airplanes. A ground server 404 (which may operate similarly to the ground server 114) may be configured to communicate with airplanes 402*a*, 402*b*, . . . 402*n* either via a direct communication link or through a satellite connection using satellites 408*a*, 408*b*, 408*c*, . . . 408*n*. Databases 406*a*, 406*b*, . . . 406*n* may be used to store passenger information including sensor data that generates measurement report generation 404*a*, 404*b*, 404*c*, . . . 404*n* that creates/defines/pictorially represents passenger preferences, previous flight information, passengers usage information, e.g., IFE, airplane facilities, crew contacts, food and drink purchases, internet usage, products and services viewed, purchased, or saved to be purchased at a later time, etc. The ground server 404 may communicate passenger information including the prescreening information and/or the manifest information and/or boarding and/or deboarding (deplaning) information/plan to an airplane prior to take off. This information may be used by a server on the airplane to alert/adjust sensor network and which sensor data to collect more or less of during, for example, pre-flight, during flight, and end of as described in the present document. In some embodiments, the sensor data gathering, processing and measurement report generation system depicted in FIGS. 4A-4B may include equipment that provides wireless communication connectivity between the airplane equipment and ground based server via equipment 428 such as a Wi-Fi access point at the gate, or via a cellular communication equipment such as a cell phone tower 432 that may be available to the airplane at the airport or near gate area. As depicted in FIG. 4B**, the Wi-Fi and cellular connectivity may also be available to some airplanes during flight.

Figure 5:
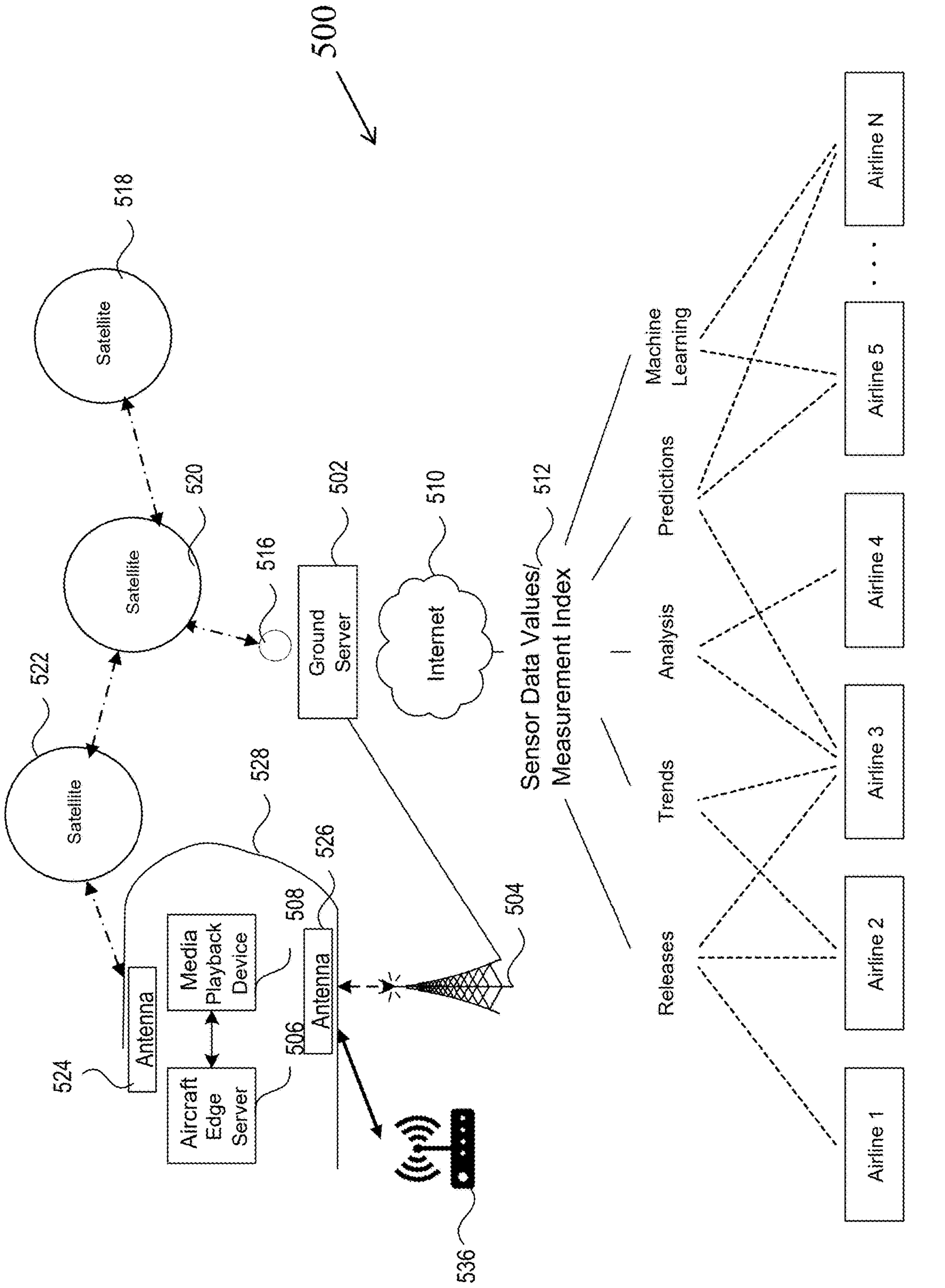
FIG. 5 shows an example of an in-flight entertainment network.

FIG. 5 shows another configuration of a system in which a ground server 502 may use information from multiple flights of multiple airlines (Airline 1, Airline 2 . . . Airline N). This information may be processed to, for example, establish trends in information based on sensor data at various previous locations where passengers were, predictions for upcoming flight of passengers in terms of sensor network recordings/reporting of likes and dislikes of passengers, and so on. In some embodiments, machine learning may be used to train a logic to perform trends (e.g., a measurement index) based on prior usage of sensor network and, for example, likes and dislikes and prior behavior/usage by passengers. Results of such analyses may be combined into the passenger information/plan 512 and stored at the ground server 502, possibly via communication through the internet 510. The ground server 502 may communicate the information via a satellite dish 516 with a network of satellites (518, 520, 522), which in turn is received in an airplane via antenna 524 by an onboard server (called edge server 506). The edge server 506 may implement the script described herein, along with providing media data to media playback devices onboard the airplane 528. Alternatively, or in addition, the ground server 502 may communication the information to the edge server 506 through a terrestrial connection such as through cellular communication via a cellular network 504 to a cellular reception antenna 526 onboard the airplane. The ground server 502 may be used, for example, to collect and distribute passenger information regarding watching $3^{rd}$ parties products and services advertisements and specials. In some embodiments, the connectivity between the ground server 502 and airplane equipment may be based on a local area wireless network (e.g., a Wi-Fi access point 536) or a cellular communication network (e.g., cell tower 504) which may be available to the IFEC for communication while during a flight or when parked at an airport terminal, near the gate area.

3. Onboard Server Deployment Examples

An IFEC installation may include an onboard server that may be implemented in the form of one or more hardware platforms that include one or more processors, one or more computer memories and network interface for digital data communications. The onboard server may be configured to provide various instructions and content to the seatback displays, the wireless access points, Bluetooth transceivers and collect sensor data from the various onboard sensors. The onboard sensor may also be configured to communicate with a ground server or another server across the internet or a computing cloud for exchanging messages related to the rules to filter the sensor data, collect and transmit the sensor data, and so on. The onboard server may perform such communication in real-time (e.g., using the satellite communication path depicted in FIGS. 1 and 4B) or offline such as communicating with the ground sever at the end of a travel segment.

4. Ground Server Embodiment Examples

Similar to the server systems onboard the aircraft described above, the ground server is understood to be a standalone computer system, or multiple standalone computer systems with general purpose data processors, memory, secondary storage, and/or a network interface device for connecting to each other. The computer systems may have an operating system installed thereon, along with the server applications that implement the various components of the system for sensor data collection and processing according to the embodiments disclosed herein. The ground server may store the passenger profiles and/or the rule database as disclosed herein. Various technical solutions described herein may be implemented at the ground server and/or be controlled by a control from the ground server. For example, the aforementioned sensor network measurements and transmission thereof to the ground server may be performed under instructions from a ground server.

5. Example Embodiments and Solutions

To solve the above-discussed problems, among others, the following technical solutions may be adopted by some embodiments.

Figure 2:
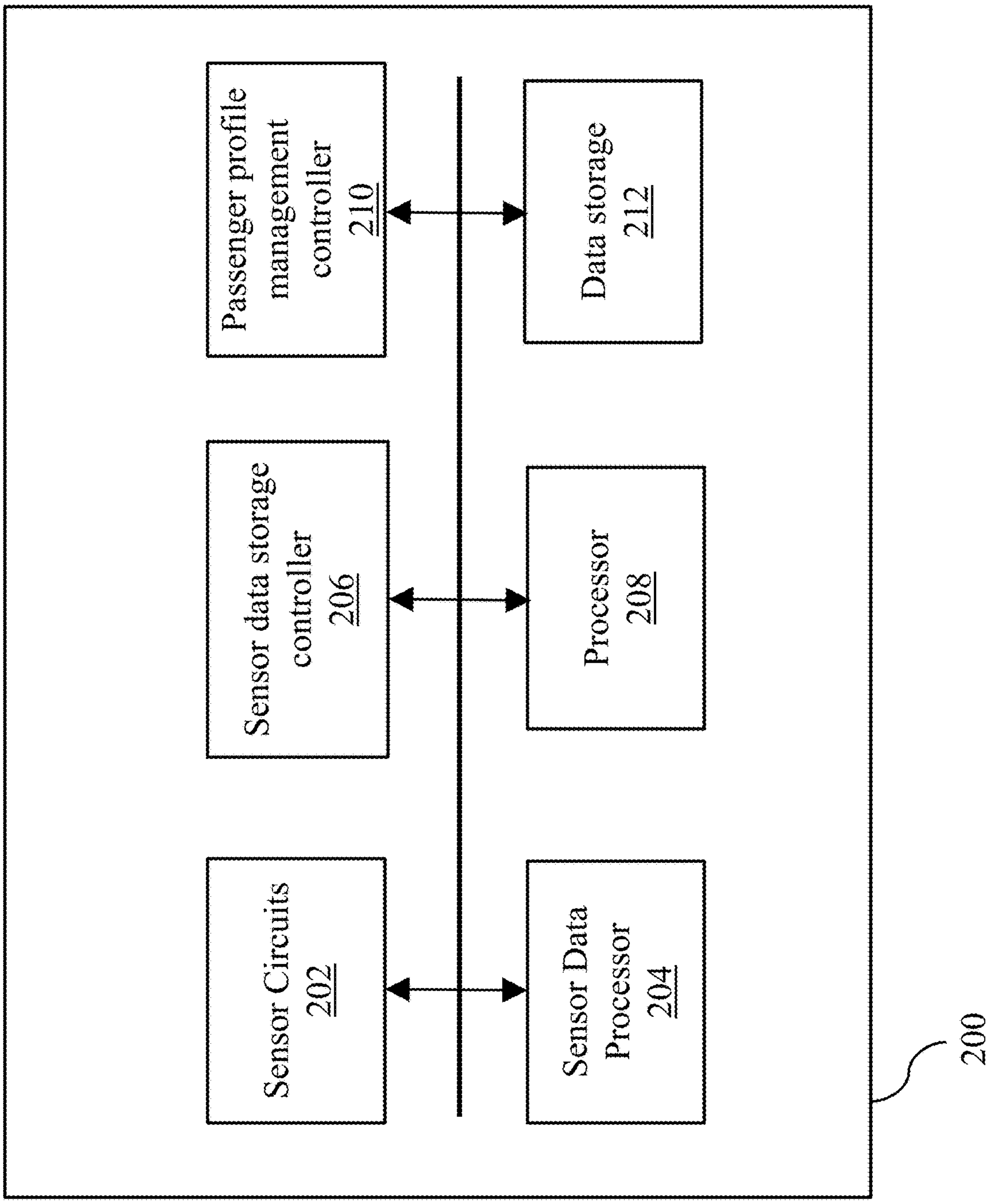
FIG. 2 shows an example of a system for sensor data collection and analysis.

1. A system for sensor data collection (e.g., system 200 depicted in FIG. 2) in a commercial passenger vehicle, includes a plurality of sensor circuits (202) configured to collect a plurality of sensor data values from a plurality of sensors including sensors from an in-flight entertainment (IFE) network in an airplane of a set of airplanes. The system 200 also includes a sensor data processor (204) configured to interpret the plurality of sensor data values from the plurality of sensors according to a rule. The system 200 also includes a sensor data storage controller (206) configured to store the plurality of sensor data values according to a plurality of sensor data profiles, the plurality of sensor data profiles being associated with sensor types. The system 200 also includes a passenger profile management controller (210) configured to filter the plurality of sensor data values by processing a plurality of passenger profiles that are related to at least some of the plurality of sensor data values. The system 200 also includes a processor (208) configured to analyze the plurality of sensor data values using the rule and produce a measurement index according to each of the plurality of passenger profiles. The system 200 also includes a data storage (212) that is structured to store the indexes corresponding to the plurality of passenger profiles such that the indexes are available through a query from an authorized agent, wherein the indexes are normalized with respect to the plurality of sensor data values or the plurality of passenger profiles.

Some examples of the plurality of sensor circuits 202 are also disclosed in sections 2 and 6 of the present document.

Some examples of sensor data values that are collected by the plurality of sensors are also described in sections 2, 6, 7 to 10 of the present document.

Some examples of the how the sensor data processor 204 may interpret the sensor data values are also disclosed in sections 2 and 11 of the present document.

Figure 8:
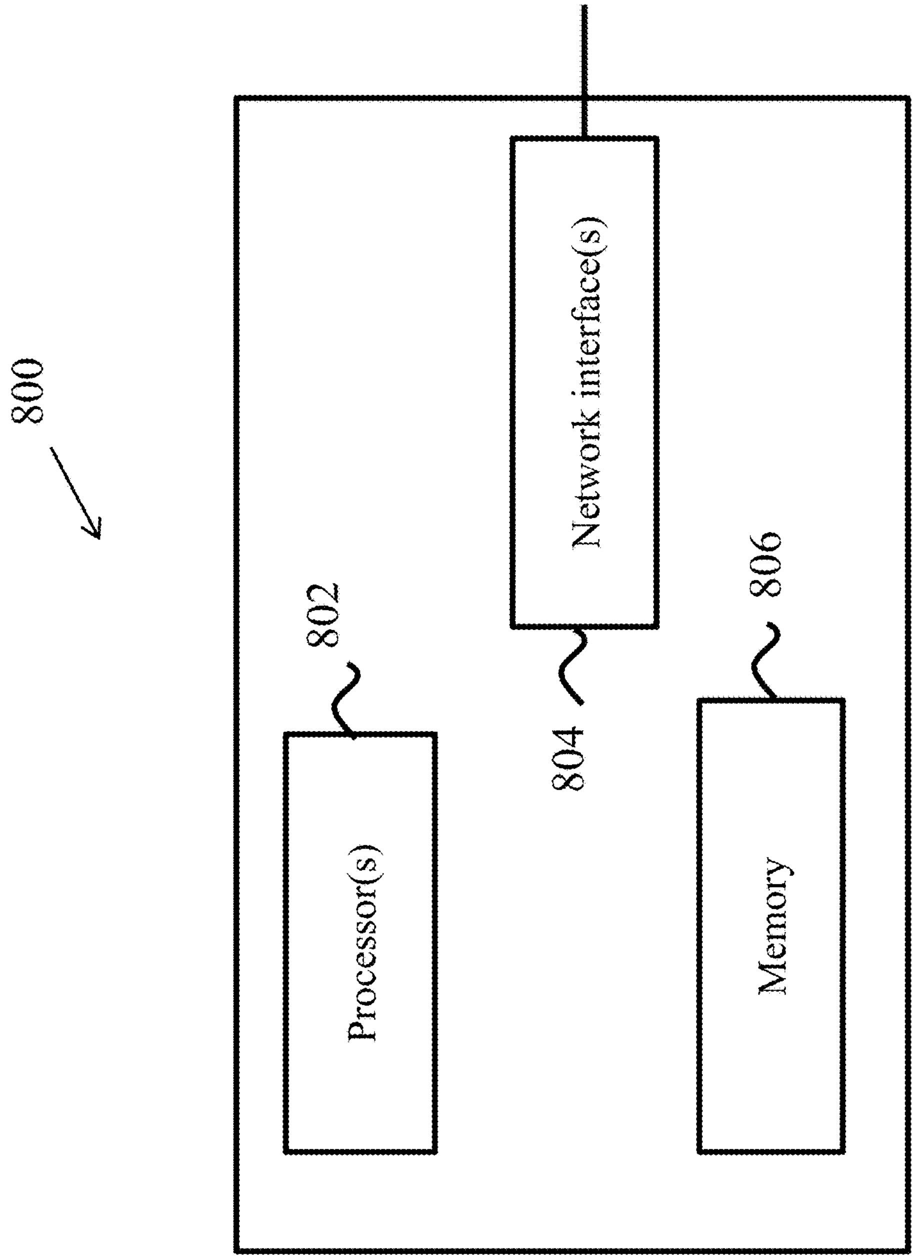
FIG. 8 is a block diagram of a hardware platform on which methods disclosed in the present document may be implemented.

The sensor data storage controller 206 may be implemented using computing resources in a cloud or using one or more hardware platforms, e.g., as disclosed with respect to FIG. 8.

Some examples of the processor configured to analyze the plurality of sensor data values and rules used to produce a measurement index are disclosed in sections 2, and 11 to 14 of the present document.

2. The system of solution 1, wherein the plurality of sensors includes touch sensors disposed on seatback displays of the commercial passenger vehicle, and wherein the plurality of sensor values includes where, when and how often passenger interactions are received on touchscreens of the seatback displays. Additional examples and details are disclosed in sections 2 and 6 of the present document.

3. The system of solution 1, wherein the plurality of passenger profiles has profile attributes associated therewith, the profile attributes including an attribute to an airline of the commercial passenger vehicle, an attribute specific to a passenger history, or an attribute specific to the commercial passenger vehicle. Additional examples are disclosed in section 13 of the present document.

4. The system of solution 1, wherein the rule specifies a time window applied for interpreting the plurality of sensor data values, a geographical location applied for interpreting the plurality of sensor data values or a use context applied to the plurality of sensor data values. Additional examples of rules are disclosed in section 16.

5. The system of solution 1, wherein the indexes are normalized to measure a level of interaction by the passengers with IFE.

6. The system of solution 5, wherein the indexes are normalized across different airplanes in the set of airplanes.

7. The system of solution 5, wherein the indexes are normalized across different airlines operating airplanes in the set of airplanes.

8. The system of solution 1, further including: a ground server configured to communication with airplanes in the set of airplanes, wherein the ground server includes the processor and the passenger profile management controller. Example implementations and configuration of the ground server are disclosed with reference to FIGS. 1, 4A, 4B and 5.

Figure 6:
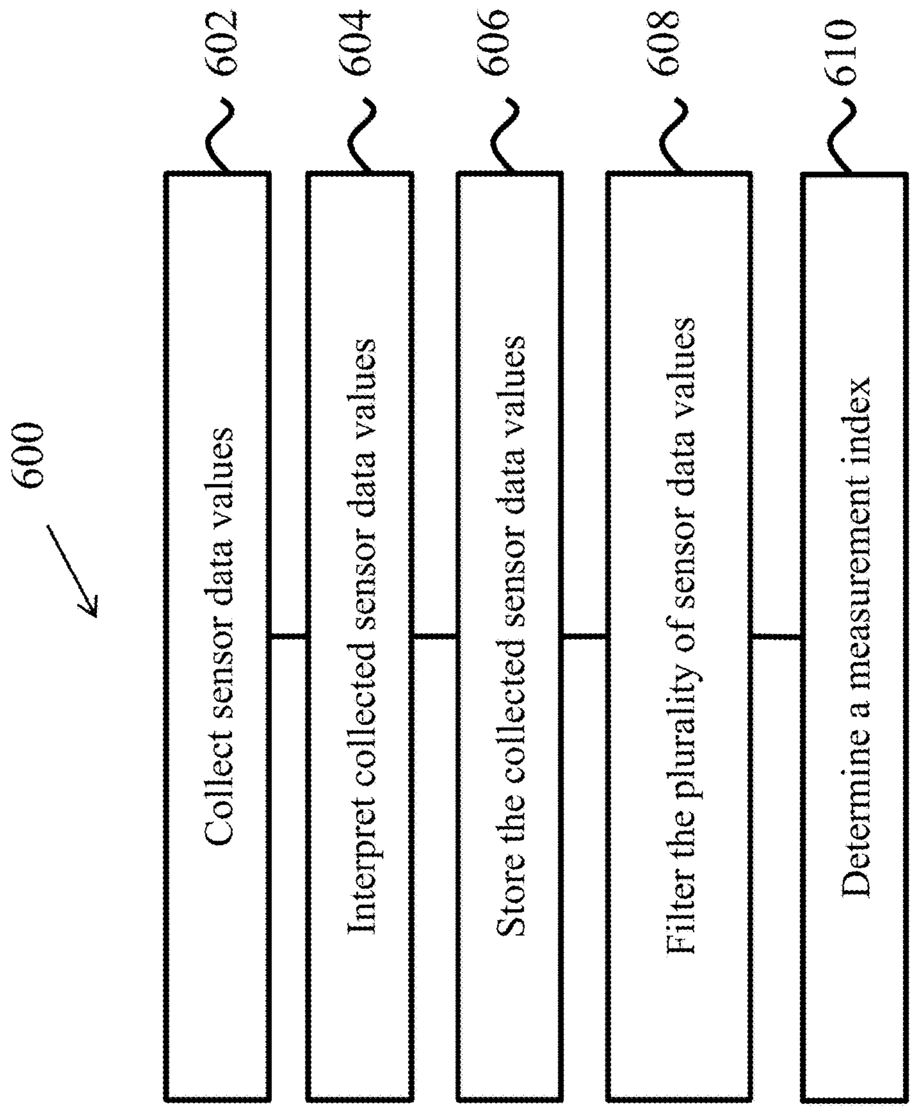
FIG. 6 is a flowchart for an example method of sensor data measurement and reporting.

In some embodiments, the system 200 may implement a method (e.g., method 600 depicted in FIG. 6) that includes collecting (602) sensor data values, interpreting (604) the collected sensor data values according to a set of rules, storing (606) the collected sensor data values to a database, filtering (608) the plurality of sensor data values according to a rule of filtering, and determining (610) a measurement index, as disclosed in the present document. Additional details and examples of the method 600 are described with respect to the operation of the system 200.

9. A system for generating a measurement report of passengers in a commercial passenger vehicle (e.g., system 300 depicted in FIG. 3), includes a sensor network (302) configured to electronically collect a plurality of sensor data values from a plurality of sensors in a commercial passenger vehicle. The system 300 further includes a passenger information database (306) that is configured to store passenger information. The system 300 further includes a rule database (304) that is configured to store a set of rules associated with the passenger information database and the sensor network. The system 300 further includes one or more processors (308) configured to (a) receive an instruction to generate a measurement report, and (b) generate the measurement report according to the instruction by processing information from the passenger information database and the plurality sensor data values according to a rule from the set of rules identified by the instruction. The system 300 further includes a user interface (310) configured to present the measurement report.

10. The system of solution 9, wherein the plurality of sensors includes touch sensors disposed on seatback displays of the commercial passenger vehicle, and wherein the plurality of sensor values includes where, when and how often passenger interactions are received on touchscreens of the seatback displays. Additional examples of sensors are disclosed in sections 2 and 6 of the present document.

11. The system of solution 9, wherein the rule specifies that the passenger information in the passenger information database is anonymized with respect to passenger identities. Additional examples of the set of rules is disclosed in section 16 of the present document.

12. The system of solution 9, further including: a ground server configured to communicate with airplanes in the set of airplanes, wherein the ground server includes the one or more processors. Additional examples of the ground server are disclosed with reference to FIGS. 1, 4A-4B and 5.

13. The system of solution 12, wherein the rule identifies a specific airline or a specific passenger profile or a specific sensor type and wherein the one or more processors are configured to generate the measurement report by normalizing the plurality of sensor data values according to the rule. Additional examples are disclosed in section 16.

14. The system of solution 9, wherein each of the plurality of passenger profiles includes attributes, wherein the attributes include an invariant attribute that remains unchanged throughout lifetime of use of a corresponding passenger profile and a variable attribute that changes during the use of the corresponding passenger profile. Additional examples are disclosed in section 13.

Figure 7:
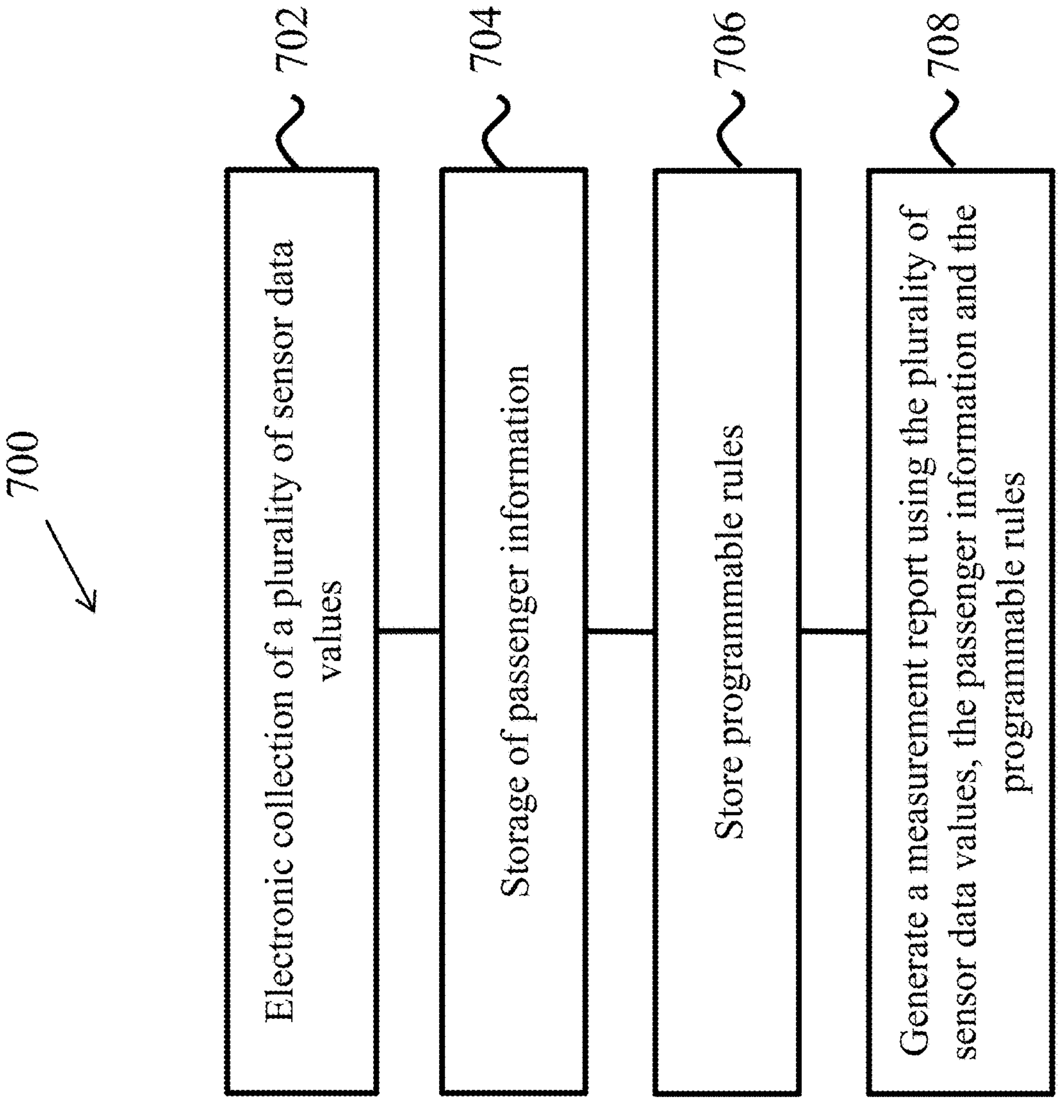
FIG. 7 is a flowchart for an example method of sensor data measurement and reporting.

15. A method of passenger activity measurement (e.g., method 700 depicted in FIG. 7), comprising: operating a sensor network to electronically collect (702) a plurality of sensor data values from a plurality of sensors associated with an inflight entertainment (IFE) network in a commercial passenger vehicle; storing (704) passenger information pertaining to passengers in the commercial passenger vehicle in a passenger information database; storing (706) a set of rules associated with the passenger information database and the plurality of sensor data values in a computer memory; and generating (708) a measurement report of by processing the plurality of sensor data values and the passenger information database according to a rule from the set of rules; and providing the measurement report on a display interface according to a display selection.

16. The method of solution 15, wherein the plurality of sensors includes touch sensors disposed on seatback displays of the commercial passenger vehicle, and wherein the plurality of sensor values includes where, when and how often passenger interactions are received on touchscreens of the seatback displays.

17. The method of solution 15, wherein the rule specifies that the passenger information in the passenger information database is anonymized with respect to passenger identities.

18. The method of solution 15, further including: operating a ground server to communication with airplanes in the set of airplanes, wherein the ground server includes the one or more processors.

19. The method of solution 18, wherein the rule identifies a specific airlines or a specific passenger profile or a specific sensor type and wherein the one or more processors are configured to generate the measurement report by normalizing the plurality of sensor data values according to the rule.

20. The method of solution 15, wherein each of the plurality of passenger profiles includes attributes, wherein the attributes include an invariant attribute that remains unchanged throughout lifetime of use of a corresponding passenger profile and a variable attribute that changes during the use of the corresponding passenger profile.

Additional features of the method 700 are disclosed with reference to the operation of the system 300.

6. Examples of Sensor Circuits

In some embodiments, the sensor circuits include touchscreen sensors. The touchscreen sensors may be embedded in the seatback displays of airplanes.

In some embodiments, the sensor circuits include wireless internet access transmitters and receivers and associated sensing of internet traffic.

In some embodiments, the sensor circuits include wireless control circuits such as a Bluetooth receiver/transmitter that is built into an aircraft and allows a PED to engage in a communication with the IFE.

In some embodiments, the sensor circuits include circuits that count a number of times a user initiates contact with various controls and buttons such as overhead call buttons, in-flight light, a card reader that may be built into the seat (e.g., passenger seat armrest).

In some embodiments, the sensor circuits may include circuitry that detects passenger interaction with other physical objects in an airplane, e.g., the seating surface on which a passenger sits, the back of a passenger seat, overhead fan control, overhead light control, flight attendant call button, window shades lowering or raising, and so on. The sensor circuitry may be configured to detect and report passenger interaction in terms of time at which it occurs and a duration for which it occurs.

7. Examples of Sensor Data Values That are Collected

In some embodiments, sensor data values may include timing of when and how often a user interacts with a sensor circuit. In some embodiments, the duration for which sensor data is perceived to engage a user in an active session may be collected. In some embodiments, the sensor values may be collected using a binary representation. For example, a logical 1 may indicate that a sensor has been activated by the passenger and a logical 0 may indicate that a sensor has been deactivated by the passenger, or alternatively, passenger has disengaged from interacting with the sensor. Furthermore, sensor data values may also include a time at which the sensor data was collected and a context within which the sensor data was collected. For example, a same position on a touchscreen may have a different meaning in different contexts, based on the visual menu presented to a passenger. For example, a passenger's touch at the exact same (x, y) or horizontal-vertical position on a screen may mean different things such as the passenger is pausing a video, or selecting a specific menu button, or making an e-commerce purchase, and so on. Accordingly, in various embodiments, the sensor data values may include a time (or a start time and an end time), a duration, or a context of the sensor interaction by the passenger. Furthermore, sensor data values may further be organized in "meta" format, e.g., to include a collection of sensor data that maps to a specific activity by a passenger. Such values may be called raw intrinsic data, as further disclosed in section 8. Other type of sensor data may include data collected by sensors that is not specific to a particular passenger, but may pertain to extrinsic or operational conditions and may provide a context for passenger activity. Some examples of the raw extrinsic data are described in section 9. The sensor data may further include raw global data that may be at an IFEC system deployment level and may be airline-specific. Some examples are disclosed in section 10.

8. Raw Intrinsic (Passenger) Data

Examples of intrinsic data which captures specific passenger interactions may include a start time, a duration and context of a passenger interaction with the IFEC platform.

One example includes a time instant at which a passenger turned on the seatback monitor and/or started or stopped browsing available entertainment and e-commerce content. Another example may include a type of PED that the passenger used for connecting to the in-flight, an amount of data traffic that the passenger has used, a type of traffic that the passenger has engaged in (e.g., email, streaming media, web browsing, etc.). Yet another raw intrinsic data may include responses provided by a passenger to an on-screen survey.

9. Raw Extrinsic (Operational Condition) Data

In some embodiments, sensors in the sensor network may be configured to collect and report data related to aircraft travel duration, travel time of the day, day of week, occupancy level in various cabins in an airplane, a location of the aircraft when sensor data is collected, and so on. In general, operational condition data may be aircraft-specific, in contrast to passenger-specific data described in the previous section.

10. Raw Global Data

In some embodiments, sensors in the network may be configured to sense and report data related to global operation of aircrafts and other events not directly related to commercial passenger travels. For example, data may be collected from news and other servers regarding current events, news clips, newly released movie titles, ongoing occurrence of live sports events, weather data, and so on.

11. Examples of Rules for Interpreting Sensor Data Values

As disclosed throughout the present document, data and passenger interactions at various levels (e.g., passenger-specific, aircraft-specific or system-wide) may be captured as raw data. The raw data may be interpreted through various set of rules to generate an interpretation of the raw sensor data. These rules of use interpretation, may for example, be used to determine an amount of wear and tear experienced by equipment that the passenger interacted with. For example, a number of times a touchscreen was touched, or a number of times an armrest remote was pulled out and stowed back may be counted. One rule may thus report repetitions and/or time of use of certain electronic and other equipment. Such information may be used to determine a repair/replacement cycle or an upgrade cycle for various equipment. One rule may be configured to determine whether equipment failure has occurred. For example, if no passenger interaction is measured on a particular touchscreen device, while other touchscreen devices are under use, then it may be likely that the unused touchscreen device is broken and needs attention. Another rule may determine whether sensor data is even being reported (or changes) from certain sensors to allow a determination of operational condition. The rules of interpretation of sensor data values may take into consideration a context of sensor touches (e.g., the location touched on a screen in the context of menu that was being displayed to the user). Another rule may determine how soon a passenger connects to the internet after boarding a flight and a time at which the passenger ends connectivity to the internet. One set of rules may be related to e-commerce activity performed by a passenger, including whether, or which, e-commerce products being offered by an airline in which the passenger showed interest. A second of rules may be specified for IFE entertainment aspects. A third set of rules may be specified for interactive games played by the user.

12. Examples of Sensor Data Profiles

Sensor data may be organized using additional information regarding a type of airplane equipment, an airline that controls the airplane equipment, a type of IFEC that is operating on the airplane, a geographic segment in which the airplane is operating, and so on. Sensor data profiles may include, for example, an identification of whether a sensor data pertains to entertainment experience, e-commerce experience, internet connectivity experience, travel experience, and so on. Sensor data profiles may further specific whether a sensor is in a direct one-to-one correspondence with a single passenger or is a sensor that collectively represents interactions of multiple passengers, e.g., a wireless access point that is serving an entire cabin of an aircraft, or a video server that is serving an entire IFEC platform in an aircraft. In some embodiments, sensor data profiles may be organized according to manufacturing or version details of the sensors. For example, depending on the electronic circuit product details, different sensor data profiles may be organized for similar sensor data. For example, one sensor data profile may be associated with a video server vendor A, or a Bluetooth vendor B, while a different sensor data profile may be associated with a video server vendor A' or a Bluetooth vendor B'.

13. Examples of Passenger Profile Data

In some embodiments, passenger profiles may be anonymized with respect to passenger identities. This may be achieved, for example, by assigning a unique identifier to a passenger that allows tracking the passenger as a unique avatar, without specifically identifying the passenger with a real-life person. The unique profile may be generated when a passenger creates an airlines account or purchases an airlines ticket using a combination of information such as name, date of birth, government assigned identifier (e.g., a national registration number or a social security number) etc. The passenger-specific information may be encrypted or anonymized using a one-way secure hash function to generate a unique one-to-one identity for the passenger in such a manner that the identity itself will not reveal information that was used as input for generating the identity.

In some embodiments, the passenger profile may have a fixed portion that remains constant across different travels by a passenger or across different airlines and a variable portion that may reflect additional attributes of current travel for which sensor data may be analyzed. The variable portion may capture attributes such as a type of ticket (e.g., business class or economy class), a travel segment (e.g., domestic or international), a travel duration, and so on.

14. Examples of Measurement Index

In some embodiments, the measurement index may be generated to measure use of an IFE by a passenger. In some embodiments, the measurement index reflects an amount of engagement that may be used to normalize the measurement across various factors. For example, in some embodiments, the normalization may be applied across different airlines. In some cases, the normalization may be applied across different aircraft equipment types. In some embodiments, the normalization may be applied across flights according to the geographical region in which the sensor data is collected. In some embodiments, normalization may be applied across other factors such as passenger cabin, certain flight details, e. g., whether flights are delayed by a certain amount (e.g., threshold of 30 minutes) or whether the flight is a red-eye flight, and so on. One example measurement index may represent a total number of normalized minutes that a passenger used an onboard IFEC system, normalized based on a duration of a flight. For example, in a first travel duration range (e.g., 0 to 3 hours), a second travel duration range (e.g., 3 to 6 hours) or a third travel duration range (e.g., 6 hours or more), if a same unweighted number of passenger use minutes are observed, the measurement index for the smallest duration flight may be considered greater than that of the medium or long duration flight because the passengers spent a greater percent of time during the travel. In another example, if scenario one shows 1 hour IFEC engagement by a passenger, where the passenger traveled on a single flight segment, and scenario 2 also shows 1 hour IFEC engagement by the passenger, that includes 30 minute segments on two travel segments such that the passenger continued watching a same program on the next segment, in such a case scenario 2's measurement index may be weighted higher because continued passenger engagement across multiple flight segments may be considered a positive sign for passenger engagement. In some embodiments, the measurement index may normalize actual passenger engagement minutes with the IFEC by scaling with respect to actual engagement minutes available to a passenger. For example, an overall engagement score may be determined as a ratio between actual passenger minutes and maximum availability minutes. In one illustrative example, for a flight segment with duration of 2 hours (120 minutes), certain minutes at the beginning of the flight segments and at the end of the flight segment may not be available for entertainment viewing or connectivity due to government regulations (e.g., first 20 minutes and last 10 minutes). In such a case, the "denominator" used for normalization of the passenger engagement minutes may be 120–30=90 minutes of maximum availability instead of the 120 minutes actual travel duration. The overall engagement score may provide a more robust way to measure passenger engagement trends by eliminating variations due to "dead time" in IFEC connectivity including technical errors and blackout due to government regulations.

In some embodiments, a machine learning (ML) algorithm may be used to perform the normalization. The ML algorithm may be trained to take into account several factors as described above to compute a measurement index under different input vectors, The hyperparameter weights may be initially adjusted using human feedback to train the ML model to scale up or scale down the measurement values of a particular sensor type according to the various normalization factors. In some cases, the ground truth used for training the ML model may be determined according to a policy. For example, the policy may set relative weights among different factors. One example includes giving a higher weight to a passenger's use of IFEC during a red-eye flight over a normal flight (e.g., twice as much weight). Another example includes assigning a higher weight to every e-commerce transaction sensed occurring on a particular flight segment where a promotion is occurring. Yet another example includes adjusting weights based on a trend, e.g., based on training ML model. For example, in current Covid situation, contactless interactions (e.g., use of PED) may be given a greater weight than contact-based interactions with the IFEC.

In some embodiments, the measurement index may be determined by assigning a relative weight to various onboard engagement types and averaging the overall passenger engagement with the IFEC system. For example, the relative weights may be between 0 and 1, adding up to a total of 1, and may be assigned to various activities (television, movies, internet, video gaming, etc.) according to a rule that may be specified by the airlines or a third party. As further described in Section 16, each airlines may use a different strategy with respect to onboard experience for passengers based on the airlines' desired mix of loyalty (NPS), ancillary revenue and cost efficiencies, monitoring of various sensors for their maintenance and replacement cycle, etc.

Figure 9:
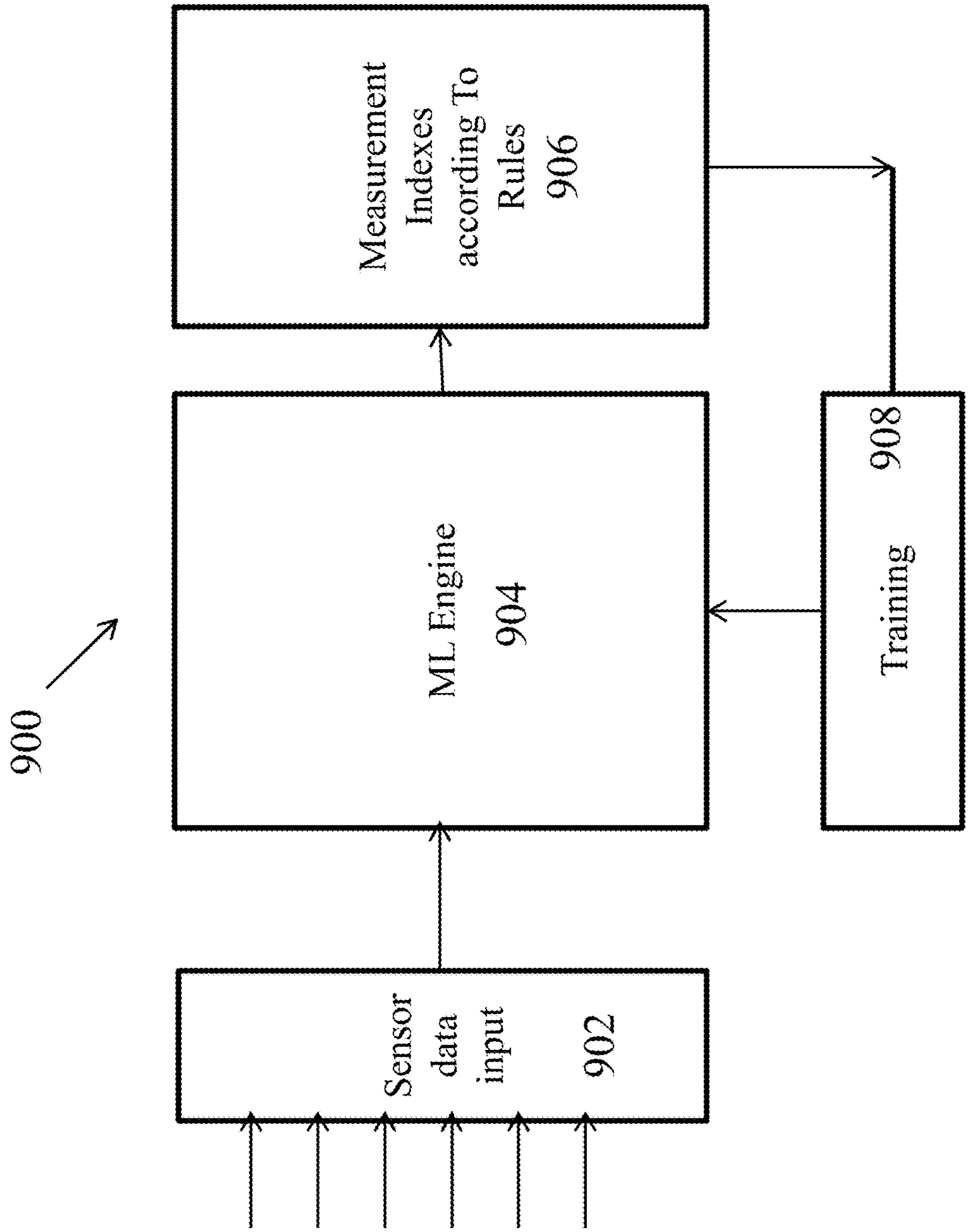
FIG. 9 shows a Machine Learning (ML) configuration for determination of a passenger engagement index.

FIG. 9 shows an example of a system configuration 900 in which an ML model is used for the generation of a measurement index or passenger engagement minutes. Sensor data inputs 902 are used as inputs to the ML engine 904 that is operated according to a set of rules as disclosed herein. The ML model generates one or more measurement indexes 906 according to measurement rules. For example if a measurement rule specifies to generate three different indexes—one for passenger engagement with touchscreens, another for passenger engagement with internet connectivity and a third index for passenger engagement with IFEC video games, three different measurement indexes may be output by the ML engine 904. A training feedback 908 may be used for training the ML model. The training feedback 908 may be human-assisted, where a human user may provide certain rules or ground truth values to the ML engine 904.

In some embodiments, the measurement index or the passenger engagement minutes may be computed as a weighted average that normalize the various factors disclosed herein. One example of the measurement index may be that passengers used, on the average, IFEC of a particular airline for 15 minutes per hour of flight time. This number of average use (the measurement index, in this case) may be determined as a weighted average over all passengers or all passengers in a particular cabin class, etc. Another example of the measurement index may be a weighted average of the type of underlying sensor data (e.g., connectivity, gaming or entertainment interaction). For example, the measurement index may be determined in units of minutes by averaging entertainment minutes multiplied by a first weight, connectivity minutes multiplied by a second weight and video gaming multiplied by a third weight. The weights may be adjusted based on a number of passenger interaction touches or based on whether the passenger engagement is based on passenger PED or based on seatback displays. For example, more passenger interaction touches may increase the weight to the particular activity. One rule may specify that more passenger use of PED may be given a greater weight. It will be appreciated that various rules may be specified to extract meaning out of sensor data according to a programmable rules engine that can be specified by a user of the sensor data. In some embodiments, various ML models may be trained according to a set of hyperparameters that are based on a desired rule or target of the computation of measurement index. For example, one ML model may be trained to provide a greater weight to IFEC entertainment minutes while another ML model may be trained to provide greater weight to situations

15. Examples of Presentation of Data

In some embodiments, the measurement index may be presented according to viewing criteria specified by a user. Upon receiving an instruction to present the measurement index, a check may be performed about whether the request has been received from an authorized agent. For example, data storage may comprise data compiled for many different airlines and each airlines may be authorized only to access measurement index for its own aircrafts. In some embodiments, a third party, e.g., an IFEC solution provider or an industry-rating organization, may be authorized to access sensor data values for all airlines to provide measurements across various airlines. Depending on the display instruction received, the measurement index may be presented along a timeline of evolution passenger engagement minutes over time for a given airlines, or a given aircraft equipment time, or a given geographic region, or a given activity (e.g., entertainment, PED use, e-commerce, gaming, etc.) and so on.

16. Examples of Rules

The present document discloses various techniques that may be implemented by embodiments in an in-flight entertainment setting for collection of sensor data that captures passenger interactions with IFEC and analyze the interactions according to a set of rules. The rules may allow analysis of use of IFEC by passengers to find out various metrics associated with the onboard electronics and communication network and services as passenger engagement therewith. As described throughout the document various rules may be used to specify which sensor data is captured, how the data is captured, how the data is interpreted, how passenger profiles are anonymized and used to measure engagement with the IFEC, and so on. In some embodiments, the rules may be specified a priori, that is only sensor data that fits the description specified by the rule may be captured. Such an operation may reduce complexity and computational burden on a ground server by not having to store and analyze information that is not needed for generation of a measurement index. Alternatively, or in addition, in some embodiments, the rules may be a posteriori, e.g., all possible sensor data may be captured and stored, but rules may specify which of the captured data is to be used for a specific measurement index request. One operational advantage of a posteriori rules is to allow a flexible data mining on all available data. Another advantage of using a posteriori rules is to allow continual training of an ML model by providing the ML model with a full complement of sensor data, while only selectively use data needed for a particular query.

17. Additional Features

It will be appreciated by one of skill in the art that the present document discloses techniques that allow capturing passenger interactions with various sensor networks onboard an airplane, and in particular sensors that are part of an IFEC deployment. The passenger interactions may be anonymized with respect to passenger identity. It will further be appreciated that the passenger use of the IFEC system may be tracked along with the flight details such as duration of flight, whether the flight was delayed and by how much, use of a passenger cabin information and so on. It will further be appreciated that anonymized passenger data may be used for communication with third party servers such as e-commerce vendors or banking servers to obtain information about passenger purchases done during a travel. It will further be appreciated that some embodiments implement a flexible programmable rule database that can be customized to the needs of a specific airlines or a specific IFEC vendor and used for obtaining passenger engagement minutes of sensor network use measurement across different times, or different airplane equipment or different IFEC vendors. As such, based on passenger engagement minutes or a passenger engagement index generated at different times or different airplane equipment or different IFEC vendors allows the airline/IFEC vendors to update their offerings on-board (features, products, and services) on a current/subsequent flight based on the sensor data that tells passenger interaction with IFEC (timing, duration, and type of interactions with IFEC).

Accordingly, some embodiments may be in the form of a software for in-flight entertainment and connectivity systems. In some embodiments, a software for transportation entertainment and connectivity systems may be used to obtain sensor data information and determine passenger use information. The software may be configured for monitoring, quantifying, qualifying, aggregating, analyzing, and reporting aircraft passengers' use of and interaction with aircraft entertainment and connectivity systems. In some embodiments, the software platform may be offered as a software as a service (Saas) for monitoring, quantifying, qualifying, aggregating, analyzing, and reporting passengers' use of and interaction with aircraft entertainment and connectivity systems; computer hardware. Further, in some embodiments sensor and other hardware for in-flight and transportation entertainment and connectivity systems may be used for collecting passenger interaction information for use of in-flight and transportation entertainment and connectivity systems and component parts thereof. The software may be implemented at a ground server and may use sensor network measurements received from various airplanes in a set of airplanes. The set of airplanes may include various types of aircraft equipment operated by one or more airlines. The sensor network data may be received at the grounder server in real-time, e.g., using a satellite connection, or may be downloaded to the ground server upon completion of a flight segment. The sensor data may be stored in a database by performing a first processing on raw data to provide the raw data additional contextual meaning as disclosed herein. The sensor data may further be processed according to a requested display option and a target goal for an authorized used to obtain a meaningful interpretation of the data. While the specific embodiments are disclosed in the present document with reference to airplanes and aviation commercial travel, the disclosed embodiments include deployments in other commercial settings such as a train, a cruise ship or a travel bus.

It will further be appreciated that the present document disclosed methods that may be implemented by embodiments to provide an industry-standard way of measuring passenger engagement with an airlines' entertainment offerings in an equal-comparison manner across different aircraft equipment types, different airlines, different IFEC vendors, different geographical areas, and so on. One beneficial advantage of the embodiments is that the passenger profile is abstracted over actual identity of a passenger and therefore may offer a reliable measurement index over a large sample size. For example, a first measurement index of airlines A, aircraft type B may be measured over a passenger profile "business class traveler" and may be compared with a similar measurement index for a same passenger profile with aircraft type B operated by airlines C. Alternatively, the same passenger profile ("business class traveler") may be used to compare measurement indexes across aircraft type B and aircraft type D, both operated by the sample airlines A. As further disclosed throughout the present document, the normalized, or equalized, comparison allows airlines to determine how various electronics and equipment installation onboard an aircraft is being used by the passengers, allowing the airlines to determine repair and maintenance schedules, upgrade cycles, and so on. In one advantageous aspect, the techniques described in the present document may be used to enhance passenger engagement with the onboard IFEC system and a passenger's digital experience, which in turn can be used to increase passenger loyalty to the airlines (e.g., Net Promoter Score NPS) and/or cost efficiencies by providing each passenger a right IFEC service at the right time for the right duration.

In some embodiments, inflight surveys may be offered to passengers (possibly with additional perks and incentives to fill the surveys). These surveys may be regressed against the measured activities (using sensor data) to determine activities and IFEC configurations that offers the greatest passenger satisfaction and engagement.

In some embodiments, airlines may utilize passenger engagement minutes with engagement quality factors to manage the onboard digital experience and create onboard yield management systems to drive their desired mix of loyalty (NPS), ancillary revenue and cost efficiencies. This could include a model similar to flight dispatch model where desks within the Operational Control Center (OCC) are focused on managing flight plan development for a particular geographic sector. In some embodiments, airline "Engagement Managers" in the OCC for each sector (e.g., Pacific Northwest) may configure the onboard digital experience for specific routes/flights to maximize engagement scores (PEMs) and their desired mix of loyalty/NPS, ancillary revenue and cost efficiencies. Such a Cabin Yield Management activity may be similar to the current pre-flight yield management efforts airlines deploy in selling fares. Thus, various sensor data collected during previous flights may be advantageously used to configure future operation of onboard IFEC systems and sensory networks by providing appropriate technical resources for each flight segment. The configuration may include—maintenance and repair cycle of IFEC equipment, number of video titles to load onto an onboard server, placement and availability of wireless connectivity access points, types of video games, internet e-commerce merchandise to be made available, and so on.

The various embodiments introduced herein can be implemented by, for example, programmable circuitry (e.g., one or more microprocessors, programmed with software and/or firmware), or entirely in special-purpose hardwired circuitry (e.g., non-programmable circuitry), or in a combination of such forms. Special-purpose hardwired circuitry may be in the form of, for example, one or more application-specific integrated circuits (ASICs), programmable logic devices (PLDs), field-programmable gate array (FPGAs), etc. In some embodiments, the methods may be stored in the form of computer-executable instructions that are stored on a computer-readable medium. Alternatively, or in addition, cloud-based computing resources may be used for implementing the embodiments.

FIG. 8 shows an example of a hardware platform 800 that may be used for implementing various methods and ML algorithms or engines disclosed in the present document. The hardware platform may be implemented as a single physical unit, multiple units (e.g., a server chassis or a server farm) or as a distributed set of computing resources (e.g., cloud resources). The hardware platform 800 may include one or more processors 802 configured to execute code. The hardware platform 800 may include one or more network interfaces (wired or wireless) configured to input or output data (e.g., sensor data, measurement indexes, rules, etc.) between the hardware platform 800 and other parts of the system. The hardware platform 800 may include one or more computer-readable memories 806. The memories 806 may be optionally external or internal to the processor(s) 802. The one or more memories 806 may store processor-executable code for implementing a method disclosed in the present document.

CONCLUSION

The embodiments set forth herein represent the necessary information to enable those skilled in the art to practice the embodiments and illustrate the best mode of practicing the embodiments. Upon reading the description in light of the accompanying figures, those skilled in the art will understand the concepts of the disclosure and will recognize applications of these concepts that are not particularly addressed herein. These concepts and applications fall within the scope of the disclosure and the accompanying claims.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

Reference herein to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

From the foregoing, it will be appreciated that specific embodiments of the invention have been described herein for purposes of illustration, but that various modifications may be made without deviating from the scope of the invention. Accordingly, the invention is not limited except as by the appended claims.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A method comprising:

receiving a plurality of sensor data values measured by a plurality of sensors of in-flight entertainment (IFE) networks in multiple airplanes of multiple equipment types operated by multiple airlines, a plurality of sensor data values, wherein the plurality of sensors includes touch sensors disposed on seatback displays of the airplane, wherein the plurality of sensor data values includes where, when, or how often passenger interactions are received;

wherein the plurality of sensor data values includes a first duration of time that a passenger is engaged with the touch sensors;

normalizing the first duration of time that the passenger is engaged with the touch sensors based on a second duration of time available for the passenger to engage with the touch sensors;

inputting results of the normalizing the first duration of time to a machine learning model to produce one or more measurement indexes, wherein the machine learning model generates the one or more measurement indexes based on a measurement rule that specifies which of the plurality of sensor data values is used for a specified measurement index of the one or more measurement indexes; and providing feedback based on the one or more measurement indexes to the machine learning model to update a parameter of the machine learning model.

2. The method of claim 1, further including:

measuring, based on the one or more indexes, passenger engagement with entertainment offerings by the multiple airlines across the multiple equipment types.

3. The method of claim 2, wherein the measuring is abstracted over actual identities of passengers according to passenger profiles.

4. The method of claim 1, wherein producing the one or more measurement indexes further includes applying a weight of a plurality of weights to the first duration of time, wherein the plurality of weights are determined by a machine-learning model that uses the plurality of sensor data values as input.

5. The method of claim 1, wherein the one or more measurement indexes include a first index associated with passenger engagement with touchscreens, and a second index associated with passenger engagement with internet connectivity.

6. The method of claim 5, wherein the one or more measurement indexes includes a third index associated with passenger engagement with video games.

7. The method of claim 1, wherein the plurality of sensor data values comprise a plurality of types of sensor data values, and wherein producing the one or more measurement indexes are produced by computing a weighted average among the plurality of types of sensor data values.

8. The method of claim 7, wherein the updated parameter of the machine learning model includes a weight used to compute the weighted average.

9. A non-transitory computer-readable medium storing processor-executable program code that, upon execution by one or more processors of a computing system, causes the computing system to:

receive a plurality of sensor data values measured by a plurality of sensors of in-flight entertainment (IFE) networks in multiple airplanes of multiple equipment types operated by multiple airlines, a plurality of sensor data values, wherein the plurality of sensors includes touch sensors disposed on seatback displays of the airplane, wherein the plurality of sensor data values includes where, when, or how often passenger interactions are received;

wherein the plurality of sensor data values includes a first duration of time that a passenger is engaged with the touch sensors;

normalize the first duration of time that the passenger is engaged with the touch sensors based on a second duration of time available for the passenger to engage with the touch sensors;

input results of the normalizing the first duration of time to a machine learning model to produce one or more measurement indexes, wherein the machine learning model generates the one or more measurement indexes based on a measurement rule that specifies which of the plurality of sensor data values is used for a specified measurement index of the one or more measurement indexes; and provide feedback based on the one or more measurement indexes to the machine learning model to update a parameter of the machine learning model.

10. The non-transitory computer-readable medium of claim 9, wherein the execution by the one or more processors further cause the computing system to:

measure, based on the one or more indexes, passenger engagement with entertainment offerings by the multiple airlines across the multiple equipment types.

11. The non-transitory computer-readable medium of claim 10, wherein the measuring is abstracted over actual identities of passengers according to passenger profiles.

12. The non-transitory computer-readable medium of claim 11, wherein producing the one or more measurement indexes further includes applying a weight of a plurality of weights to the first duration of time, wherein the plurality of weights are determined by a machine-learning model that uses the plurality of sensor data values as input.

13. The non-transitory computer-readable medium of claim 9, wherein the one or more measurement indexes include a first index associated with passenger engagement with touchscreens, and a second index associated with passenger engagement with internet connectivity.

14. The non-transitory computer-readable medium of claim 13, wherein the one or more measurement indexes includes a third index associated with passenger engagement with video games.

15. The non-transitory computer-readable medium of claim 9, wherein the plurality of sensor data values comprise a plurality of types of sensor data values, and wherein producing the one or more measurement indexes are produced by computing a weighted average among the plurality of types of sensor data values.

16. The non-transitory computer-readable medium of claim 15, wherein the updated parameter of the machine learning model includes a weight used to compute the weighted average.

17. A system comprising:

a ground server comprising one or more processors, configured to:

receive a plurality of sensor data values measured by a plurality of sensors of in-flight entertainment (IFE) networks in multiple airplanes of multiple equipment types operated by multiple airlines, a plurality of sensor data values, wherein the plurality of sensors includes touch sensors disposed on seatback displays of the airplane, wherein the plurality of sensor data values includes where, when, or how often passenger interactions are received;

wherein the plurality of sensor data values includes a first duration of time that a passenger is engaged with the touch sensors;

normalize the first duration of time that the passenger is engaged with the touch sensors based on a second duration of time available for the passenger to engage with the touch sensors;

input results of the normalizing the first duration of time to a machine learning model to produce one or more measurement indexes, wherein the machine learning model generates the one or more measurement indexes based on a measurement rule that specifies which of the plurality of sensor data values is used for a specified measurement index of the one or more measurement indexes; and provide feedback based on the one or more measurement indexes to the machine learning model to update a parameter of the machine learning model.

18. The system of claim 17, wherein the ground server is further configured to provide media data to media playback devices of the IFE networks in the multiple airplanes.

19. The system of claim 17, wherein the plurality of sensors further includes a sensor that detects a passenger interaction with at least one of: a seating surface, an overhead fan control, an overhead light control, a flight attendant call button, or a window shade.

20. The system of claim 17, wherein the ground server is further configured to:

normalizing measurement indexes from multiple airlines with respect to each other.

* * * * *